United States Patent [19]

Liu

[11] Patent Number: 5,104,077
[45] Date of Patent: Apr. 14, 1992

[54] SUCTION CUP
[75] Inventor: Bao-Shen Liu, Taipei, Taiwan
[73] Assignee: Hung Mei Brush Co., Ltd., Ta Wu Lun, Taiwan
[21] Appl. No.: 696,128
[22] Filed: May 6, 1991

Related U.S. Application Data

[63] Continuation-in-part of Ser. No. 549,758, Sep. 7, 1990, abandoned.

[51] Int. Cl.⁵ .............................................. A47F 5/00
[52] U.S. Cl. .................................. 248/205.8; 248/363; 248/683
[58] Field of Search ............... 248/205.8, 205.5, 205.6, 248/205.7, 205.9, 206.1, 206.2, 206.3, 206.4, 683, 363

[56] References Cited

U.S. PATENT DOCUMENTS

| | | | |
|---|---|---|---|
| 1,871,113 | 8/1932 | Compter et al. | 248/205.8 |
| 2,028,640 | 1/1936 | Zaiger | 248/205.8 |
| 2,940,713 | 6/1960 | Van Dusen | 248/205.8 |
| 4,133,575 | 1/1979 | Mader | 248/205.8 X |
| 5,029,786 | 7/1991 | Wu | 248/205.7 |

FOREIGN PATENT DOCUMENTS

| | | | |
|---|---|---|---|
| 1030452 | 6/1953 | France | 248/206.1 |
| 2347563 | 11/1977 | France | 248/205.7 |
| 0694654 | 9/1965 | Italy | 248/206.1 |
| 1387618 | 3/1975 | United Kingdom | 248/205.8 |

Primary Examiner—Ramon O. Ramirez
Attorney, Agent, or Firm—Saint Island Int'l Patent & Trademark Office

[57] ABSTRACT

The suction device includes a chamber having a closed end, an open end and an annular fringe connecting the closed end and the open end. The closed end has a securing device centrally extended into the chamber and two parallel bracket supports being formed on the closed end. A slot is formed between each of the bracket support and the closed end. A suction cup has a holding device at the top portion thereof and is connected to the securing device of the chamber by a screw joint, in which condition the annular fringe of the chamber presses tightly against the suction cup.

6 Claims, 8 Drawing Sheets

SUCTION CUP

This invention is a CIP application of the application Ser. No. 07/549,758, which was filed on Sept. 7, 1990 and is now abandoned.

BACKGROUND OF THE INVENTION

1. FIELD OF INVENTION

The invention relates to a suction cup, more particularly to a high performance device with a means for clamping, inserting and hanging.

2. DESCRIPTION OF THE RELATED ART

Household appliances such as knives, potato peelers, cheese slicers, dishcloths after use get nowhere to drip dry, causing much trouble for the users. If they are stored on a table, they occupy potentially useful workspace. Occasionally, a wet dishcloth may easily incubate germs which decay the dishcloth and shorten its useful life. The suction devices currently used are generally dull in appearance and unique in purpose. Each attached on a smooth surface by means of suction, probably drop off after a period of time creating unnecessary damage to household utensils, or the need to permanently damage the surface of a wall in order to fix the device firmly into position. These and other troubles bring about much inconvenience in using conventional suction device.

SUMMARY OF THE INVENTION

The main object of the present invention is to provide a high performance suction device which includes means for the clamping, inserting and hanging of household utensils.

According to the present invention, a suction device comprises a main body, a suction element axially screwed to the main body, a clamping member including two parallel bracket supports which form a slot therebetween with the main body. Small household utensils, such as a knife and scissors, can be inserted in the slot. The bracket support each form a slit with the main body to allow the clamping of cleaning cloths. The main body of the present suction device further comprises a chamber with an opening, a hollow annular fringe and a securing means located at the top center thereof. A hook can be combined with the main body to provide a facility for hanging household cleaning cloths and other small articles.

The present suction device further includes a suction element with a T-shaped bolt portion disposed at the top thereof. When the T-shaped bolt portion is fixed to the securing means of the main body, the hollow fringe of the same presses against the diaphragm of the suction element. If the main body is secured more tightly on the diaphragm, the diaphragm will stick more powerfully to the wall on which it is applied.

The composing elements in the present invention are made of plastic material and these components respectively form individual units which are later assembled to become a whole device.

BRIEF DESCRIPTION OF THE DRAWINGS

Other features and object of the present invention will become more apparent in the following detailed description, including drawings, all of which show a non-limiting forms of the present invention, and of which.

DETAILED DESCRIPTION OF THE PREFERRED EMBODIMENT

Figure 1:
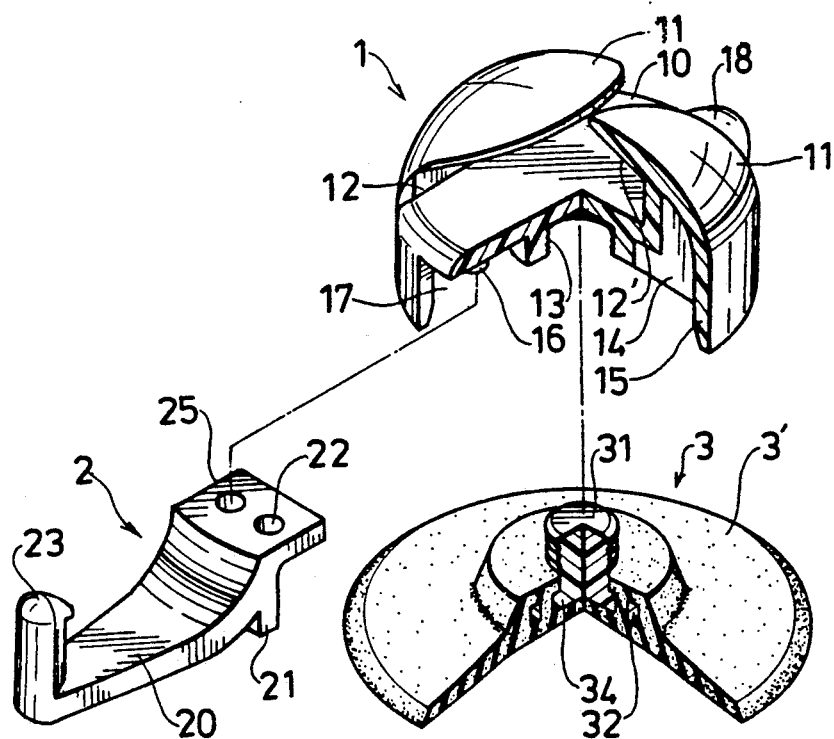
FIG. 1 is an exploded perspective view of the preferred embodiment in accordance with the present invention.

FIG. 1 is an exploded view of a preferred embodiment of a suction device of the present invention. As illustrated, the device includes a main body (1), a suction member (3) and a hook (2). The main body (1) has a clamping element at its top. The clamping element comprises two bracket supports (11) substantially parallel with one another, and forming a slot (10) therebetween with the main body (1). Small articles such as a knife or scissors can be inserted and supported thereat.

A slit (12,12') is formed between each of said bracket supports (11) and the main body (1). Household linens, cleaning cloths can be clamped in the slit (12,12') between the bracket supports (11). The main body (1) includes a chamber having a closed end, an open end and an annular fringe (15) connecting the closed end to the open end. The closed end has a securing means (13) at the top center thereof. The securing means (13) includes a hollow cylindrical protrusion integrally formed with the closed end of the main body (1) and having inner threads formed therein. Two ribs (14) are provided between the annular fringe (15) and the securing means (13) for reinforcing the main body (1).

Figure 13:
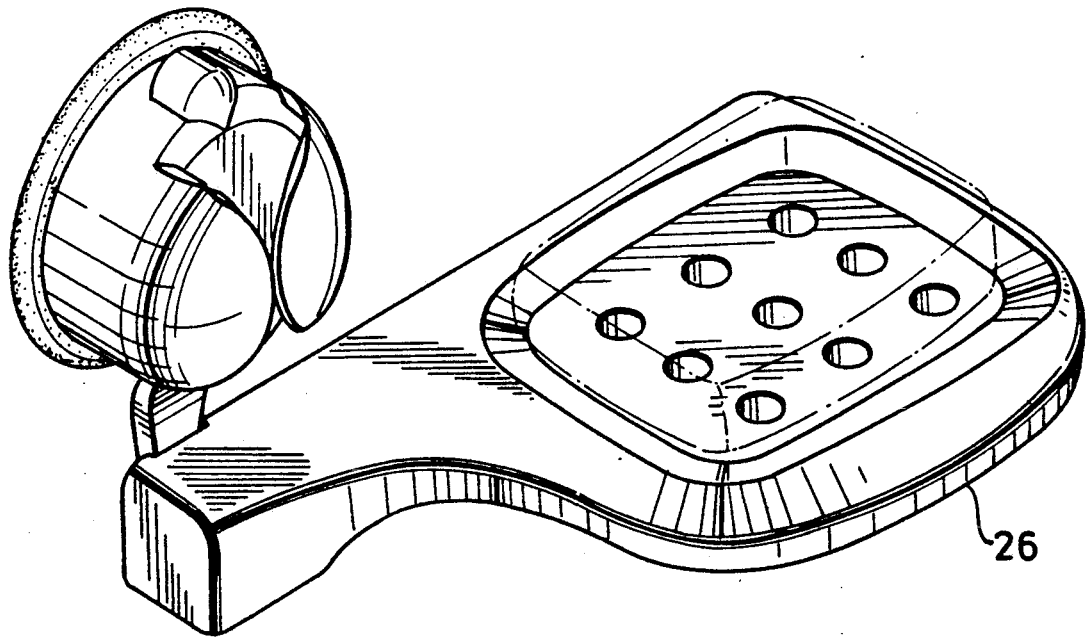
FIG. 13 shows the preferred embodiment of the present invention in use.

A hollow space (17) extends inwardly from the annular fringe (15) of the main body (1) just below the end position of the slit (12,12'). The closed end has two knobs (16) pointing downwardly from the same. The hook (2) has a raised lip (25) at one end of a head portion (20), a hooking member (23) at the other end of the head portion ((20), and a side fringe (21) between said head portion (20) and the raised lip (25). The raised lip (25) has two holes (22) formed therein while the side fringe (21) possesses a curvature similar to that of the annular fringe (15). When the hook (2) is inserted into the hollow space (17), the knobs (16) properly engage the two holes (22) of said hook while the side fringe (15) compliments with the annular fringe (15) of the main body (1) to form a closed annular fringe. The main body (1)

further includes a decorative knob (18) at a top portion thereof. A household article, such as a soap dish (26), can be mounted on the hooking member (23) as shown in FIG. 13.

Figure 12:
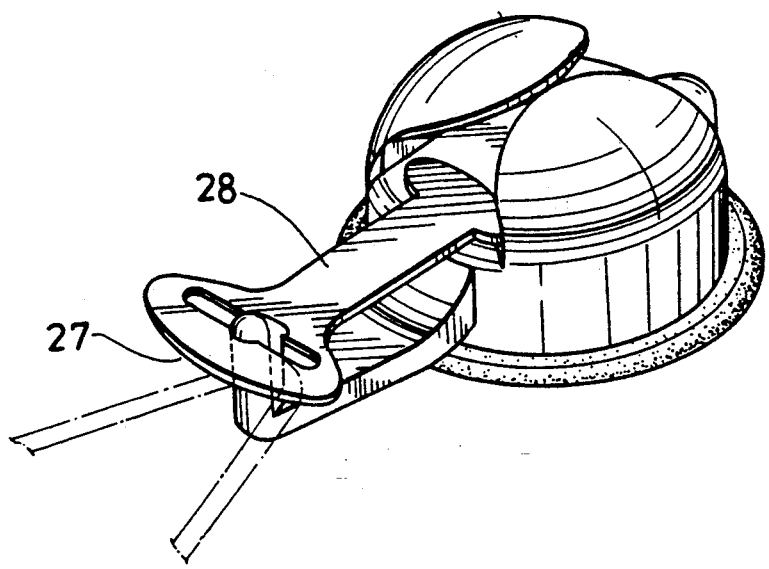
FIG. 12 shows a eighth embodiment of the present invention in use.

If the household article (27), shown by the perforated lines in FIG. 12, may slide from the hooking member (23), and a preventing plate (28) can be provided after the article (27) is hung on the hooking member (23). As a whole, the suction device can be used for hanging various articles of various shapes.

The suction element (3) of the preferred embodiment comprises a diaphragm with holding means engaged at the top center thereof. The holding means has a T-shaped bolt portion (31) integrally disposed in an annular groove (32) at the center of the suction element (3). The T-shaped bolt portion (31) is a bolt with a T-shaped head buried the in and a threaded end opposite said T-shaped head. Small holes (34) arranged at the head of the bolt portion (31) can be compressed when said head is forced into the annular groove (32). Therefore the bolt is easily installed and secured.

Figure 2:
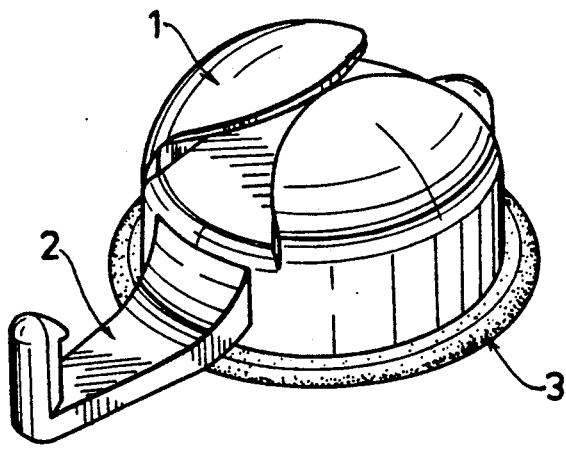
FIG. 2 is a perspective view of the preferred embodiment in accordance with the present invention.
Figure 3:
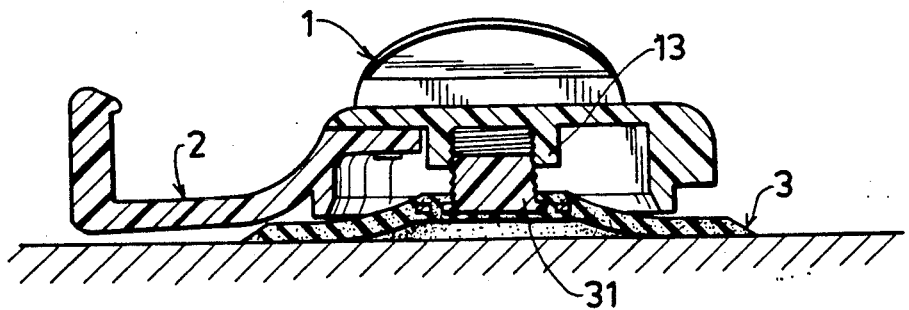
FIGS. 3 and 4 illustrate the suction mechanism of the preferred embodiment of the present invention applied to a smooth surface.
Figure 4:
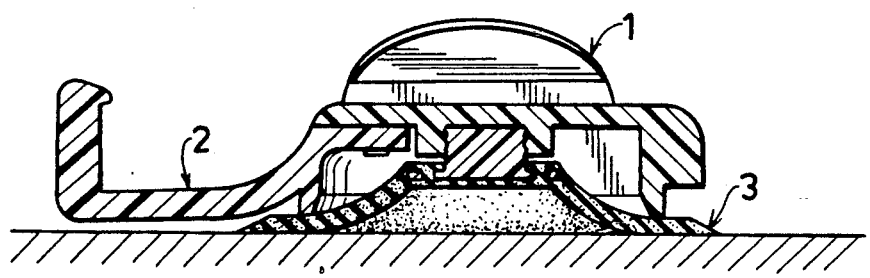

FIG. 2 illustrates a perspective, schematic view of the preferred embodiment of the suction device according to the present invention after assembly. FIG. 3 shows a cross sectional view of a suction device of the present invention being pressed onto a smooth surface. In order the diaphragm (3') of the suction device to form a stronger suction in relation to a smooth surface, the main body (1) can be secured to the suction element (3) more tightly. The imparted pressure on the main body (1) creates a vacuum between the diaphragm (3') and the smooth surface, said vacuum causing a suction force therein so that the diaphragm (3') bulges upward to stick onto the smooth surface, as shown in FIG. 4.

Figure 5:
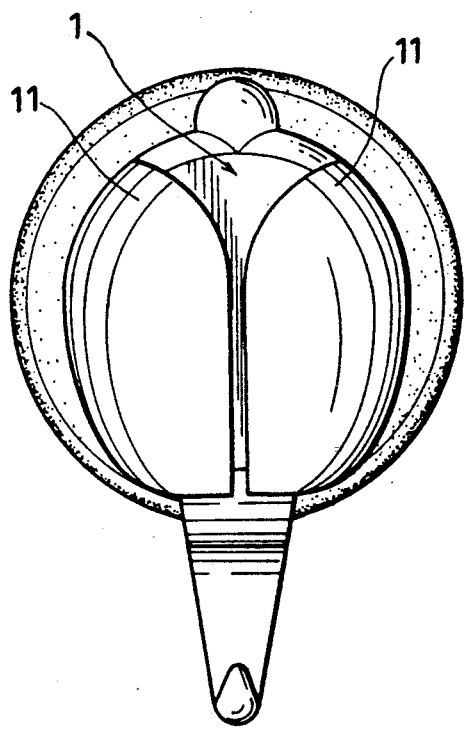
FIGS. 5, 6 and 7 illustrate the top views of the second, third and fourth embodiments respectively, in accordance with the present invention.
Figure 7:
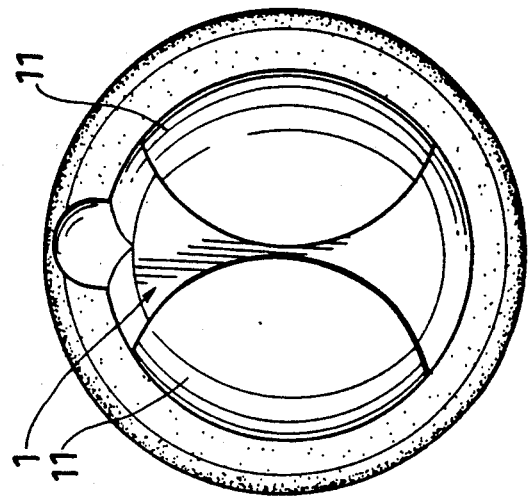
Figure 6:
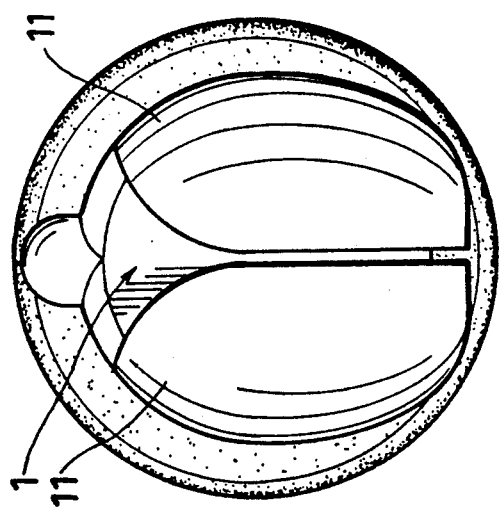

FIGS. 5 to 7 illustrate the second, third and the fourth embodiments respectively, of the present invention, showing different shapes of bracket supports (11). Various lengths of slits between the bracket supports (11) are provided to suit different sizes and shapes of household utensils to be clamped or hung in the slits.

Figure 8:
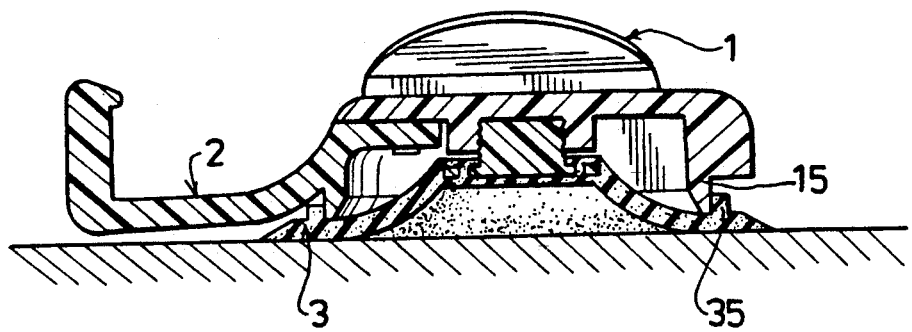
FIGS. 8 and 9, are vertical sectional views of the fifth, and sixth embodiments respectively in accordance with the present invention, when applied to a smooth surface.

FIG. 8 illustrates an embodiment of the present invention. The suction element (3) in this particular embodiment includes an annular edge with a rim (35) formed edgewise of the diaphragm. When applying the embodiment on a smooth surface, the annular fringe (15) of the main body (1) presses against the inner circumference of the rim (35) effecting a tight retention by means of the even distribution of the encountered downward force so as to prevent the annular fringe (15) from deforming and sliding over the diaphragm, creating a strong force which maintains the embodiment in an upright position.

Figure 9:
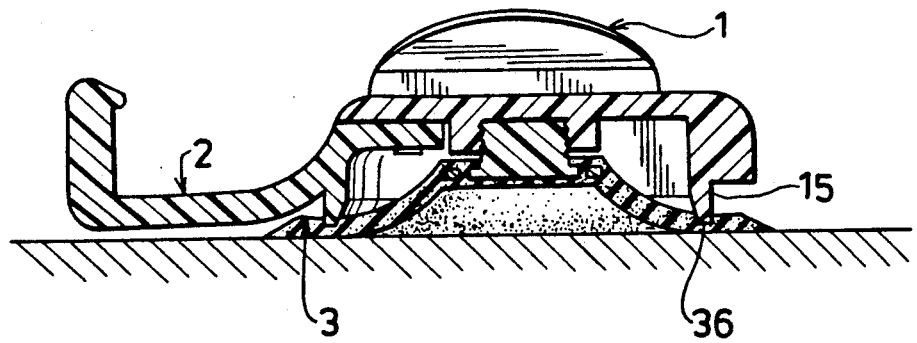

FIG. 9 shows the mechanism of the sixth embodiment of the present invention, being pressed onto a smooth surface. The suction element (3) includes an annular edge which has a depression (36) formed along the edge thereof. When inserting the annular fringe (15) of the main body (1) into the depression (36) and securing the holding means of the suction element (3) into the securing means of the main body (1), the annular fringe (15) presses into said depression (36) and evenly distributes the downward force exerted by an article hanging on the embodiment, thus preventing said embodiment from deforming and dropping off the smooth surface, while maintaining the upright position thereof.

When an article is hung on the hook (2), the articles exerted a downward force that is concentrated and supported merely by the bolt portion (31). Because of this, the bolt portion (31) is made of a plastic material. The bolt portion (31) can disengage from the annular groove (32) of the suction element (3) if the weight of the article hung thereon is more than what said bolt portion (31) can bear. To prevent this from happening, a depression or a rim must be provided on the diaphragm in order to transfer and distribute the force on the bolt portion (31) to the other parts of the suction element. As a result, load bearing capacity of the suction device is increased.

Figure 10:
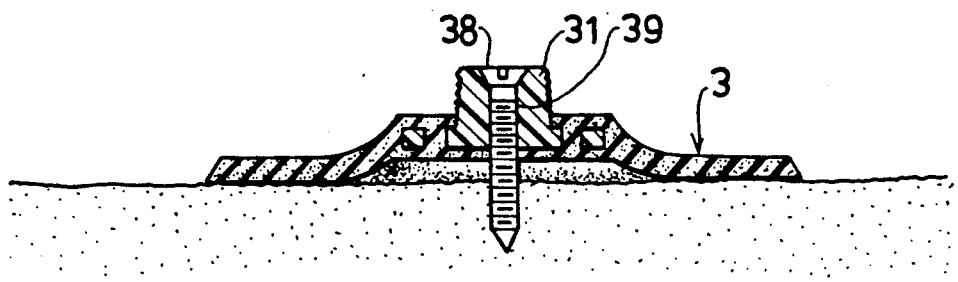
FIG. 10 is a vertical sectional view of the seventh embodiment applied to a rough surface, in accordance with the present invention.
Figure 11:
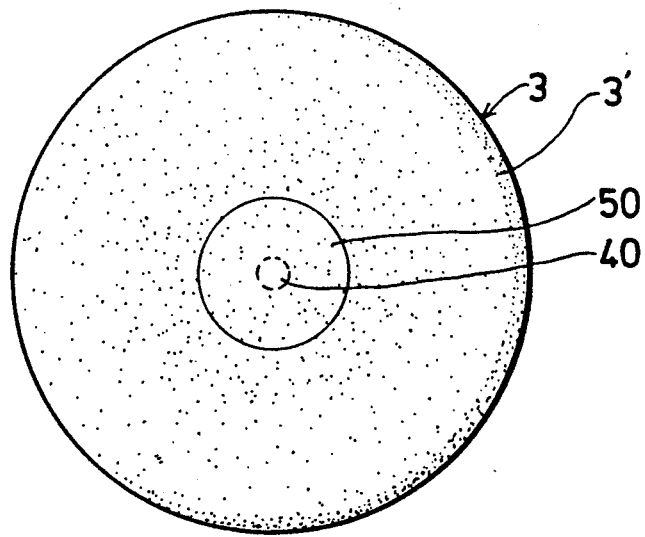
FIG. 11 is a bottom view of the seventh embodiment after being fixed with a piece of tape.

The suction device of the present invention can also be applied on a rough surface such as a wooden or cement wall by axially boring a hole (39) through the bolt portion (31) and the diaphragm (3), as shown in FIG. 10. A screw (38) is inserted into the suction element (3) in order to fix the suction device on the rough surface. If the suction device is subsequently transferred to the smooth surface, a piece of tape (50) can be patched over the hole (40) bored on the diaphragm (3') in order to close the same, as illustrated in FIG. 11, after the screw (38) is removed.

Figure 14:
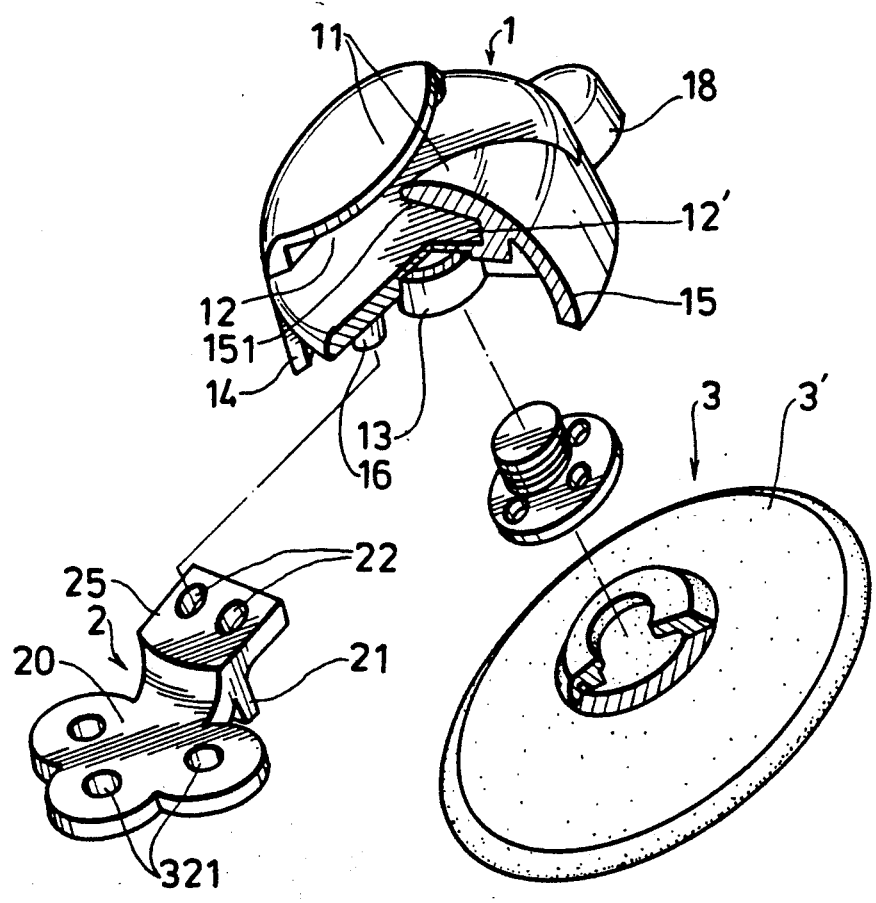
FIG. 14 shows an exploded view of a ninth preferred embodiment of the present invention.
Figure 15:
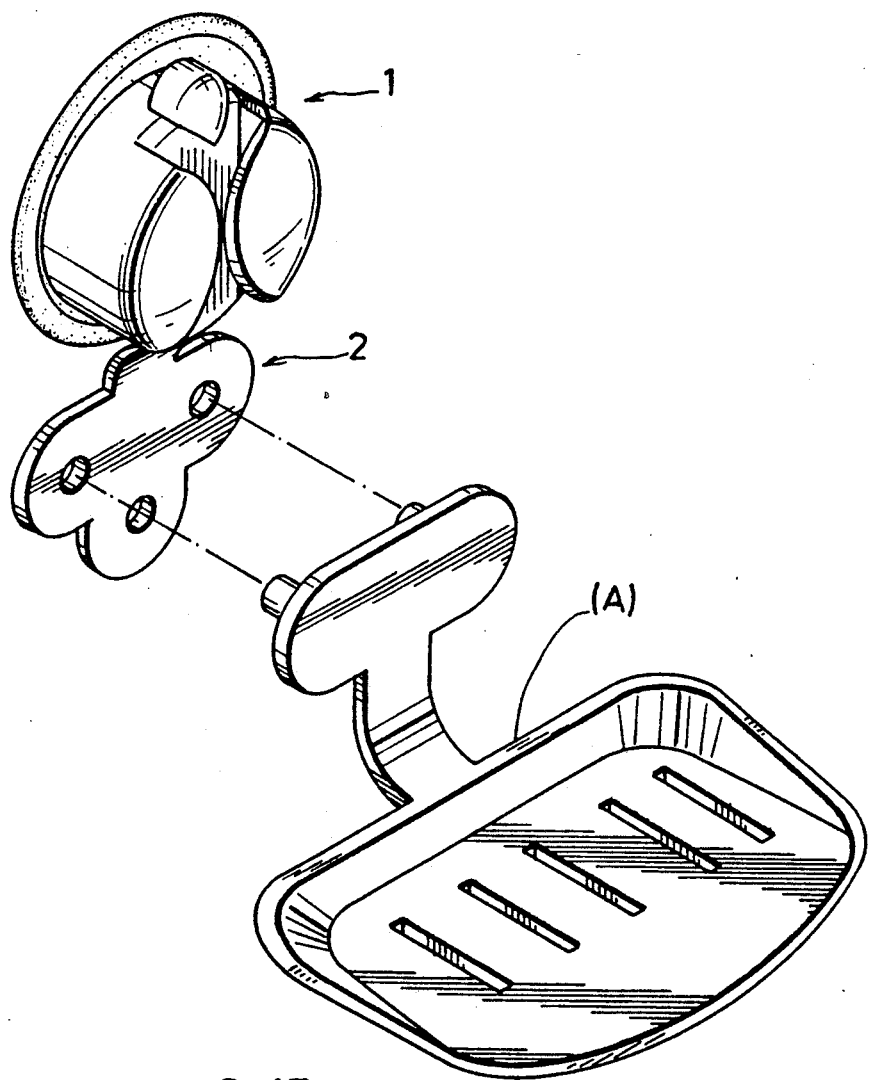
FIG. 15 shows the ninth preferred embodiment of the present invention in use.

FIG. 14 shows an exploded view of a ninth preferred embodiment of a suction device of the present invention. The components comprise in this embodiment, are generally similar to the first preferred embodiment. The only difference is that the other end, opposite to the raised lip (25) of the head portion (20) has three arcuate portions each with a hole (321) therein, see FIG. 14. The purpose of this hook (2) is same as explained above. A soap dish (A) can be mounted on said hook as shown in FIG. 15.

In short, the present invention is a high performance suction device for affixing both smooth and rough surface.

With the invention thus explained, it is obvious to those skilled in the art that various modifications and variations can be made without departing from the scope and spirit of the present invention. It is therefore, intended that this invention be limited only as in the appended claims.

I claim:

1. A suction device, comprising:

a main body having a chamber including a closed end and an open end, said chamber comprising a hollow annular fringe interconnecting said closed end and said open end, a securing means extending centrally from said closed end, said closed end having two bracket supports outside of said chamber, one facing the other, each being extended inwardly from the periphery of the same, a slit being formed between each of said bracket supports and said closed end, and a slot formed between said bracket supports; and a suction element having a diaphragm with a holding means engaged at the top center thereof, and connected to said securing means by means of a screw joint, said open end of said annular fringe being pressed hermetically against said diaphragm, said suction element being pressed on a smooth surface to create a vacuum between said diaphragm and said smooth surface, said vacuum creating a suction force to hold said suction device on said smooth surface.

2. A suction device as claimed in claim 1, wherein said main body has a hollow space disposed inwardly of said annular fringe below said slit, said closed end having two knobs formed thereon between said annular fringe and said securing means and extending into said hollow space.

3. A suction device as claimed in claim 2, wherein said main body further comprises a hook, said hook having a head portion including a raised lip and a side fringe disposed under said head portion between said raised lip and said head portion, said raised lip having a hooked portion.

4. A suction device as claimed in claim 3, wherein said head portion of said hook has two holes formed therein, the position and shape of which are compatible with said two knobs in said main body, said side fringe has a curvature similar to that of said annular fringe of said main body, whereby when inserting hook into said hollow space, said two knobs engage in said two holes and said side fringe cooperates with said annular fringe of said main body to define a closed annular fringe, thereby effecting a tight assembly of said main body and said hook.

5. A suction device as claimed in claim 1, wherein said diaphragm of said suction element has an annular edge with a depression formed along said annular edge thereof, whereby when said diaphragm so as to hold said suction device in an upright position on said smooth surface, thus preventing said suction device from being peeled off from said upright position.

6. A suction device as claimed in claim 1, wherein said annular edge has a rim formed along the edge of said diaphragm, said annular fringe of said main body being pressed against the inner circumference of said rim to effect a tight retention, thereby preventing said annular fringe from a sliding over said diaphragm when said main body and said suction element are joined together.

* * * * *